US009143381B2

(12) United States Patent
Pau et al.

(10) Patent No.: US 9,143,381 B2
(45) Date of Patent: Sep. 22, 2015

(54) SEQUENCED TRANSMISSION OF DIGITAL CONTENT ITEMS

(75) Inventors: Ewelina Pau, Saint Maur (FR); Sylvain Biancardini, Paris (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 23 days.

(21) Appl. No.: 12/425,090

(22) Filed: Apr. 16, 2009

(65) Prior Publication Data

US 2010/0268821 A1  Oct. 21, 2010

(51) Int. Cl.
| | |
|---|---|
| G06F 13/00 | (2006.01) |
| H04L 29/06 | (2006.01) |
| G06F 15/16 | (2006.01) |
| G06F 17/00 | (2006.01) |
| G06Q 30/02 | (2012.01) |

(52) U.S. Cl.
CPC .............. *H04L 29/06* (2013.01); *G06F 15/16* (2013.01); *G06F 17/00* (2013.01); *G06Q 30/02* (2013.01)

(58) Field of Classification Search
CPC ......... H04L 29/06; G06F 15/16; G06F 17/00; G06Q 30/02
USPC .......... 709/230–236, 217–219; 707/723, 727, 707/728
See application file for complete search history.

(56) References Cited

U.S. PATENT DOCUMENTS

| | | | |
|---|---|---|---|
| 6,298,373 B1 | 10/2001 | Burns et al. | |
| 6,467,028 B1 | 10/2002 | Kelley | |
| 7,985,911 B2 * | 7/2011 | Oppenheimer | 84/600 |
| 8,502,056 B2 * | 8/2013 | Oppenheimer | 84/600 |
| 8,583,671 B2 * | 11/2013 | Martin et al. | 707/765 |
| 2004/0186733 A1 | 9/2004 | Loomis et al. | |
| 2005/0186940 A1 | 8/2005 | Schatzberger et al. | |
| 2006/0230229 A1 | 10/2006 | Getzinger | |
| 2007/0025194 A1 * | 2/2007 | Morse et al. | 369/30.1 |
| 2007/0220552 A1 | 9/2007 | Juster et al. | |

(Continued)

FOREIGN PATENT DOCUMENTS

| | | |
|---|---|---|
| CN | 1941899 A | 4/2007 |
| CN | 101390167 A | 3/2009 |

(Continued)

OTHER PUBLICATIONS

"International Search Report", Mailed Date: Oct. 28, 2010, Application No. PCT/US2010/031099, Filed Date: Apr. 14, 2010, pp. 9.

Jin, et al., "Network-aware Partial Caching for Internet Streaming Media", ACM Multimedia Systems Journal, retrieved at <<http://www.cs.bu.edu/fac/best/res/papers/mmsj03.pdf>>, vol. 9, No. 4, Oct. 2003, pp. 1-11.

(Continued)

*Primary Examiner* — Kenneth R Coulter
(74) *Attorney, Agent, or Firm* — Micah Goldsmith; Judy Yee; Micky Minhas

(57) ABSTRACT

The disclosure provides a system and method for managing and sequencing the transmission of digital content items from a network-accessible content service to a portable digital content device. The content service includes a cache management subsystem and provides storage for a plurality of playlists which are variously associated with user accounts and which each contain one or more digital content items. The cache management subsystem is configured to sequence transmission of digital content items to a given portable device based on attributes associated with the playlists containing the digital content items to be transmitted to the device.

20 Claims, 5 Drawing Sheets

(56) References Cited

U.S. PATENT DOCUMENTS

| | | | | |
|---|---|---|---|---|
| 2007/0244880 | A1* | 10/2007 | Martin et al. | 707/5 |
| 2008/0005695 | A1 | 1/2008 | Ozzie et al. | |
| 2008/0033806 | A1* | 2/2008 | Howe et al. | 705/14 |
| 2008/0140239 | A1* | 6/2008 | Rosenberg et al. | 700/94 |
| 2008/0140717 | A1* | 6/2008 | Rosenberg et al. | 707/104.1 |
| 2010/0114979 | A1* | 5/2010 | Petersen | 707/803 |

FOREIGN PATENT DOCUMENTS

| | | | |
|---|---|---|---|
| KR | 1020060035323 | A | 4/2006 |
| KR | 1020060106038 | A | 10/2006 |
| KR | 1020070037017 | A | 4/2007 |
| KR | 1020080024335 | A | 3/2008 |
| WO | 02100117 | A2 | 12/2002 |
| WO | 2007085978 | A2 | 8/2007 |
| WO | 2007129081 | A1 | 11/2007 |
| WO | 2008032992 | A1 | 3/2008 |

OTHER PUBLICATIONS

"Lobster: Mobile Access to Home Media", retrieved at <<http://lobstertunes.com/Lobster-Whitepaper.pdf>>, Accessed Jan. 16, 2009, 4 pages.

State Intellectual Property Office of China, Office Action of Chinese Patent Application No. 201080017294, Oct. 30, 2013, 12 pages.

The State Intellectual Property Office of the People's Republic of China, Office Action and Search Report Issued in Chinese Patent Application No. 201080017294.9, Jun. 12, 2014, 15 pages.

European Patent Office, Supplementary Search Report Issued in European Patent Application No. 10765126.7, Jul. 3, 2014, 8 Pages.

Hofmann, et al., "Caching Techniques for Streaming Multimedia over the Internet", Published on: Apr. 4, 1999, Available at: http://vc.cs.nthu.edu.tw/home/paper/codfiles/tcsu/200201031520/Caching_Techniques_for_Streaming_Multimedia_over_the_internet.pdf, 11 pages.

State Intellectual Property Office of the People's Republic of China, Third Office Action and Search Report Issued in Application No. 201080017294.9, Nov. 15, 2014, 12 Pages.

* cited by examiner

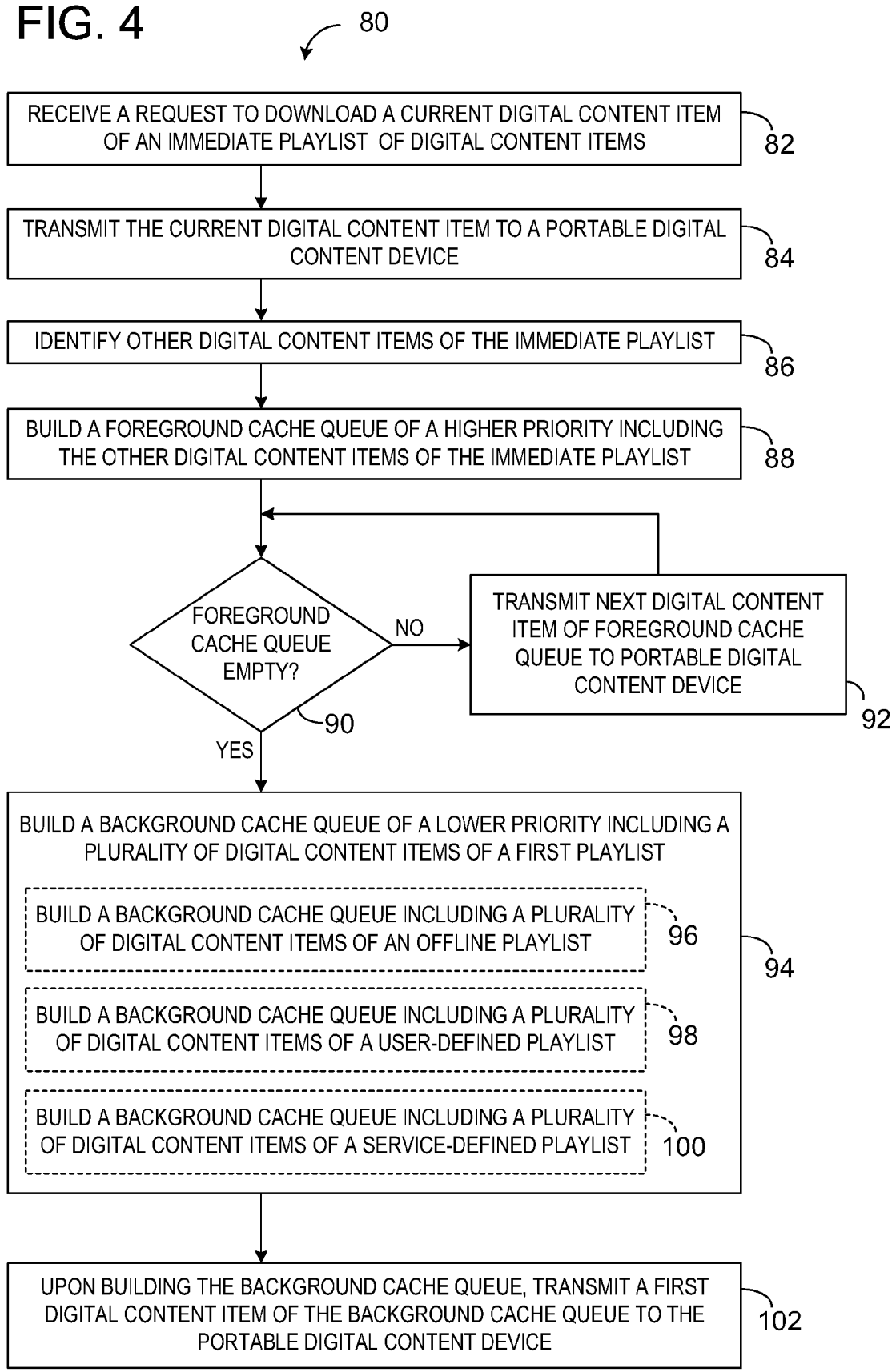

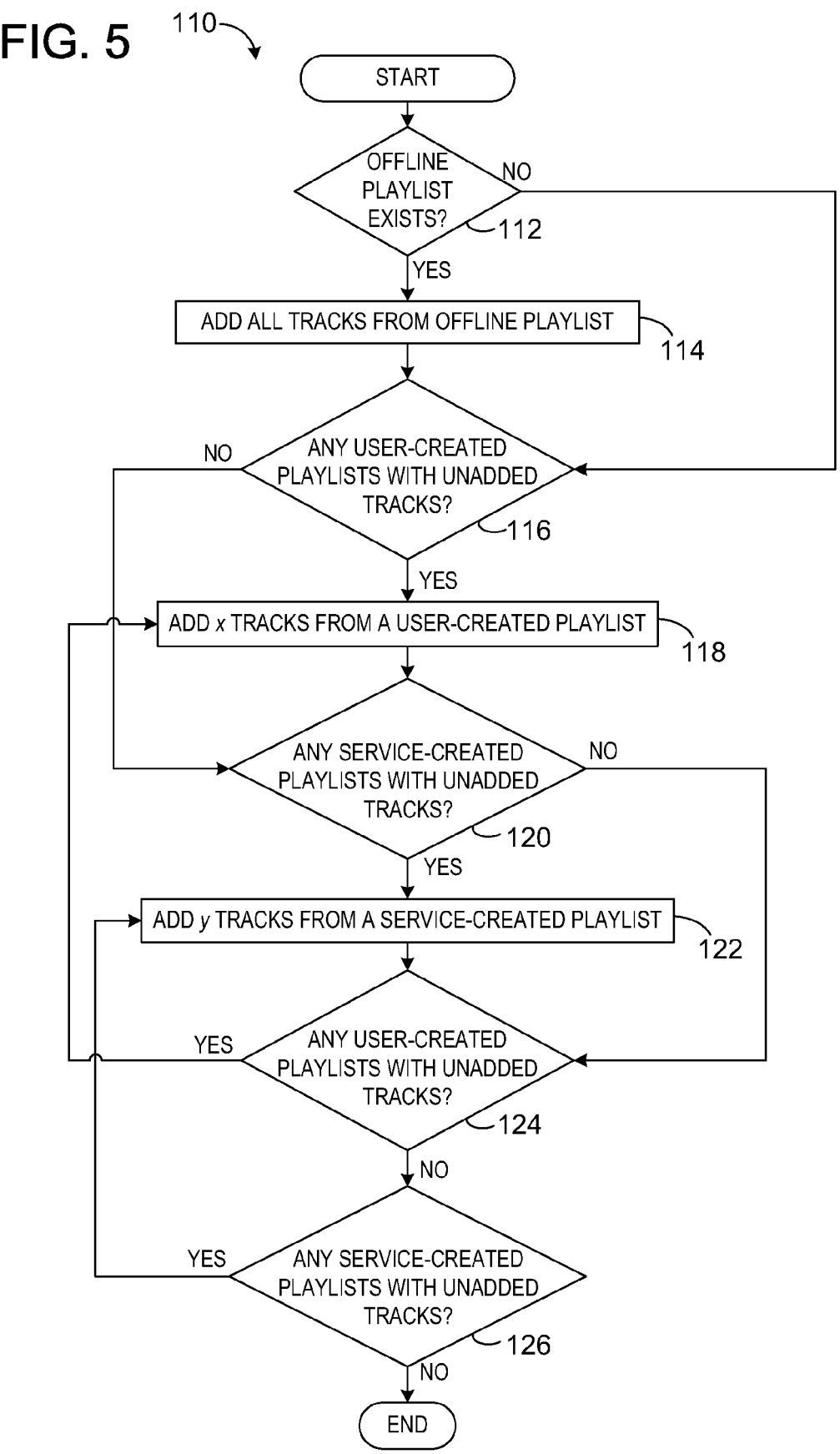

SEQUENCED TRANSMISSION OF DIGITAL CONTENT ITEMS

BACKGROUND

Digital content items, such as digital music, video, games, ringtones and the like may be grouped into playlists. Such playlists may be created by a user and/or by a service. The digital content items from such playlists may be saved to a device for organized use and enjoyment by a user. In many cases, it is desirable for primary storage of the content items and related playlists to occur at a network-accessible service, with which the remote device periodically interacts via a user account to manage the playlists, download content items, etc.

Typically, digital content items must be downloaded to the user's local device before playback, and bandwidth and download times constrain the rate at which content can be made available on the local device. In cases where many items have yet to be transferred, there is a heightened chance that the user will issue an item request that cannot be immediately satisfied. Furthermore, ineffective management of content transfer poses an even greater concern in situations where connectivity between the device and the content service is unavailable or intermittent.

SUMMARY

Accordingly, the present disclosure provides a system and method for sequencing and prioritizing the transmission of digital content items from a network-accessible content service to a portable device. In one class of examples, the content service includes a cache management subsystem and a mass storage subsystem containing a plurality of playlists that are variously associated with a plurality of user accounts. Each of the playlists has one or more digital content items and each playlist has one or more playlist attributes.

The system further includes a plurality of portable digital content devices that connect with the service via a network. For each portable device, the cache management subsystem is configured to sequence transmission of digital content items to the device based on the playlist attributes of the digital content items. As will be described in detail below, various types of playlists may be associated with a device and its user account, including user-generated playlists and service-generated playlists of varying priority levels. In some cases, super-priorities may be employed, in which transmission tasks having that priority level are completed before any other digital content items are transmitted to the portable device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows a flow diagram of an embodiment of a caching flow process between a network-accessible digital content service and a portable device.

FIG. 5 shows a flow diagram of an embodiment of a method of building a background caching queue.

DETAILED DESCRIPTION

As described above, digital content items such as digital music, video, games, ringtones and the like, may be played from a computing device such as a mobile phone. Such digital content items may be available from a network-accessible digital content service, such as an online music service, that provides digital content items which a user may purchase, play and/or download to the computing device. Oftentimes a user may group two or more digital content items into a playlist, and it is not uncommon for a user to have a variety of such playlists.

As described in more detail below, playlists may be stored and/or managed by an online service. When a user connects a computing device with such an online service, the service may, in response, transmit to the device digital content items of playlists associated with the user's account. However, in the case that the user has several playlists associated with their account, the service may adaptively sequence the transmission of the digital content items, for example, by assigning priority levels to the items. In some cases, these priority levels may be based on playlist attributes of the playlists associated with the digital content items, for example, a user-created playlist may be of a higher transmission priority than a service-created playlist containing content that the user may or may not like. Further, if a user has a limited-duration network connection, such sequenced transmission of the digital content items allows the user to receive the items of a higher priority prior to receiving those of a lower priority.

Figure 1:
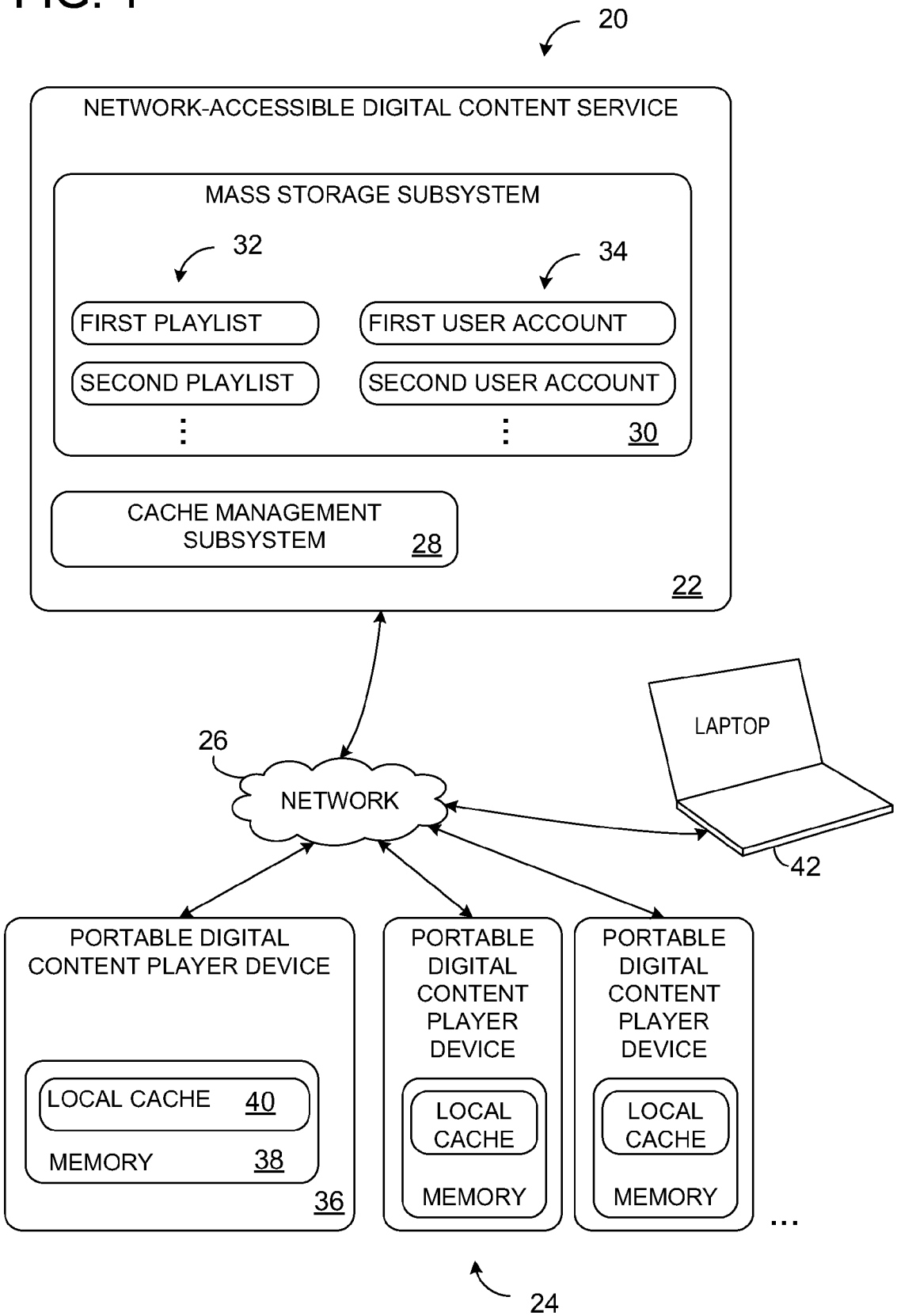
FIG. 1 schematically shows an embodiment of a digital content system in accordance with the present disclosure.

FIG. 1 schematically shows a digital content system 20 that allows for the efficient management and/or transmission of playlists from a remotely located network-accessible digital content service 22. Digital content system 20 includes network-accessible digital content service 22 configured to interact with a plurality of portable digital content devices 24 via a network 26. Network-accessible digital content service 22 may comprise a cache management subsystem 28 configured to manage the transmission of digital content items to a local cache of a portable digital content device, as described in more detail below. Network-accessible digital content service 22 may further comprise a mass storage subsystem 30 containing a plurality of playlists 32 that are variously associated with a plurality of user accounts 34, where each of the playlists 32 includes one or more digital content items. As described above, digital content items may include digital music, digital video, digital games, digital ringtones and/or virtually any digitally savable item.

Each of the playlists 32 may further have one or more playlist attributes. Such playlist attributes may describe one or more features and/or characteristics of the playlist. For example, a playlist may have an "offline" attribute, such that digital content items of the playlist may be played from a device while not connected to a network (e.g., by saving the items of such playlists to the device's local memory). As described in more detail below, "offline playlists" may be assigned a "super-priority" so that, when a network connection is present, all offline items are assigned the highest priority and are transmitted to the local device before any other transmission tasks are undertaken. This type of super-priority transmission increases the chances that a user's most important content will be available for playback, even when there is no connectivity to the central service.

As another example, a playlist may have a "user-generated" attribute, reflecting that the digital content items of playlists with that attribute were selected by a user. Alternatively, a playlist may have a "service-generated" attribute, such that the digital content items of that playlist were selected by the service (e.g., as suggestions to the user based on observed user preferences). As yet another example, the playlist may have an "immediate play" attribute, such that the digital content items of that playlist are of a high priority and are therefore to be played immediately. It should be understood that such playlist attributes are exemplary, in that any number of other such attributes of a playlist, such as genre, artist, etc. may be used.

As described above, the plurality of portable digital content devices 24 may be operatively coupled with the network-accessible digital content service 22 via network 26. Such portable digital content devices may include, for example, mobile phones, media players, laptops, notebooks, portable digital assistants and the like. Each of the portable digital content devices 24 may include memory providing a local cache, such as shown for exemplary portable digital content device 36 including memory 38 providing local cache 40. Further, each of the portable digital content devices 24 may be associated with one of the plurality of user accounts 34.

Additionally, for each of the portable digital content devices 24, the network-accessible digital content service 22 may be configured to adaptively sequence transmission of the digital content items of two or more of the playlists 32 to the local cache of that portable digital content device based on the playlist attributes of each of the two or more playlists.

For example, the two or more playlists may include an offline playlist and a service-created playlist, as described above. In such an example, the network-accessible music service may be configured to "adaptively sequence" transmission of some and/or all of the songs of these lists to a local cache of a portable device. The method of adaptively sequencing the transmission depends on the playlist attributes, for example, by sequencing the transmission of songs of the offline playlist to be of a higher priority than the songs of the service-created playlist. This example is exemplary it that any other playlist with any other playlist attributes may be sequenced differently depending on the playlist attributes. Embodiments of a method of adaptively sequencing the transmission of digital content items are discussed in more detail with reference to FIGS. 2 and 3.

In some cases, the digital content items to be transmitted may be based upon the size of the memory of the portable digital content device, such as memory 38 of exemplary portable digital content device 36. Further, in some cases, network-accessible digital content service 22 may be configured to automatically obtain the size of memory 38 from device 36. In some cases, network-accessible digital content service 22 may use this information to place size limitations on the playlists associated with the user account corresponding to the user of the device, thus ensuring the playlists will fit on the device upon transmittal. For example, such limits may be apparent to the user when the user is establishing their playlists at the network-accessible server system, e.g. via a web-browser, in which case the user may only create playlists that will fit on their device. Further, in some cases, the amount of memory available to each type of playlist may be predetermined, for example, 60% of the memory may be available for an offline playlist.

In some cases, the cache management subsystem 28 is further configured to ensure that there is storage space available on the portable digital content device 36 that is connected to the network-accessible digital content service 22 via the network 26. Cache management subsystem 28 may do this in any suitable manner, such as by removing any playlists on the device 36 that are no longer associated with the user's account. If cache management subsystem 28 determines that there still isn't sufficient storage space available on portable digital content device 36, then cache management subsystem 28 may remove digital content items in a reverse order of that established by the sequencing described herein.

It is to be understood that adaptively sequenced transmission of digital content items may also occur between the network-accessible digital content service and any other type of computing device, such as a personal computer or laptop computer, such as exemplary laptop 42. In other words network-accessible digital content service 22 may adaptively sequence transmission of digital content items to mobile computing devices and/or non-mobile computing devices.

Figure 2:
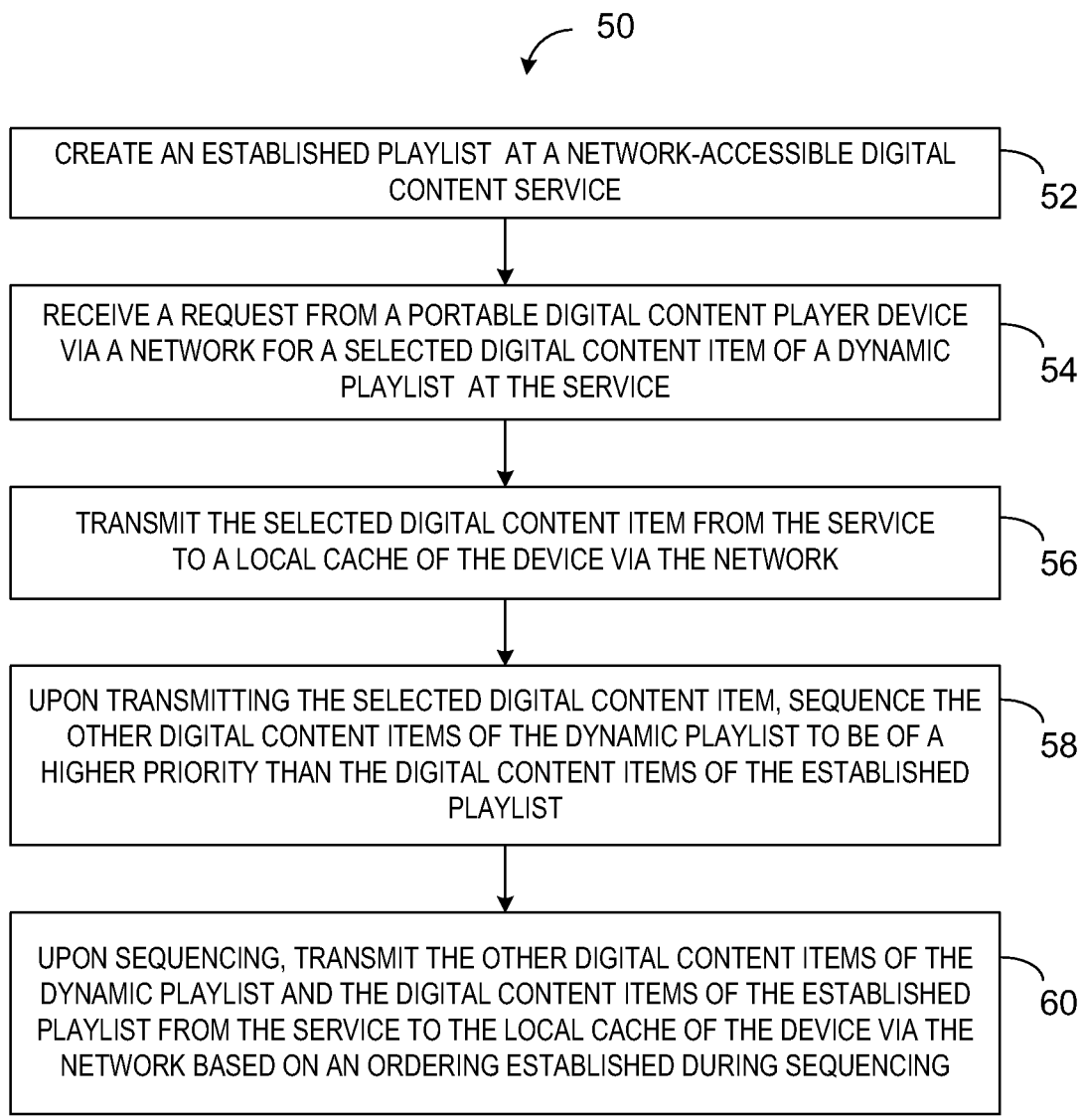
FIG. 2 shows a flow diagram of an embodiment of a method of adaptively sequenced transmission of digital content items.

FIG. 2 shows a flow diagram of an embodiment of a method 50 of adaptively sequenced transmission of digital content items from a network-accessible digital content service to a portable digital content device via a network. At 52 method 50 includes creating an established playlist at the network-accessible digital content service, where the established playlist includes one or more digital content items. Such an established playlist may be predetermined, in that it has already been created by a user or by the digital content service, and may be stored on a mass storage subsystem of the digital content service. As nonlimiting examples, such an established playlist may be an offline playlist, a user-created playlist or a service-created playlist as described above. Further, the established playlist may be any combination of such playlists. In some cases, the established playlist may be processed by the network-accessible digital content service as a background operation, as described in more detail later.

At 54 method 50 includes receiving a request from the portable digital content device via the network for a selected digital content item of a dynamic playlist at the network-accessible digital content service, where the dynamic playlist includes one or more digital content items. Such a dynamic playlist may be an immediate playlist of digital content items compiled in response to a user request to play a particular digital content item. For example, a user may request a song for immediate play. The requested song may be associated with a playlist (i.e. a dynamic playlist) at the service. For example, such a playlist may include the other songs on the album from which the selected song was requested. The service may be configured to transmit the other songs of the dynamic playlist to the user's device, as described hereafter. In some cases, the dynamic playlist may be processed by the network-accessible digital content service as a foreground operation, as described in more detail later.

At 56 method 50 includes transmitting the selected digital content item from the network-accessible digital content service to a local cache of the portable digital content device via the network. Upon the portable digital content device receiving the selected digital content item, a user of the device may now play the item.

At 58 method 50 includes upon transmitting the selected digital content item, sequencing the other digital content items of the dynamic playlist to be of a higher priority than the digital content items of the established playlist. For example, the selected digital content item may be a song of a particular album, wherein the album is the dynamic playlist. Since the user has submitted a request to receive and play the song immediately, it may be likely that the user will want to listen to other songs of that album immediately thereafter. Thus, the service designates the album (i.e. the dynamic playlist) to be of a higher priority than the established playlist.

From the above, it should be appreciated that it will often be desirable that foreground events, such as a user selecting a current track, be given transmission priority over the background queuing and transmission of content items to the local device. Even where the system is managing transmission of content items from multiple playlists (e.g., offline playlists and other user-generated playlists, service-generated playlists, etc.), it may be advantageous to allow an interruption for foreground downloading of the currently selected item. Furthermore, in addition to the currently selected item, the remaining items (or portions thereof) from the current track's playlist can be downloaded prior to resuming the background caching operations of the established playlists.

In some embodiments, rather than sequencing all of the other digital content items of the dynamic playlist, a predetermined subset of the other digital content items of the dynamic playlist may be sequenced (e.g., five tracks).

At 60 method 50 includes upon sequencing, transmitting the other digital content items of the dynamic playlist and the digital content items of the established playlist from the network-accessible digital content service to the local cache of the portable digital content device via the network based on an ordering established during sequencing. For example, in the case of the example introduced above, sequencing the items of the dynamic playlist to be of a higher priority than the items of the established playlist establishes an ordering for transmitting the digital content items. Upon establishing this ordering, the network-accessible digital content service can then proceed to transmit each digital content item based on the ordering. Such a method of sequenced transmission allows the user to receive digital content items of a higher priority prior to receiving items of a lower priority. In some embodiments, such sequencing and transmitting may involve the network-accessible digital content service establishing a foreground caching and/or transmission queue of items of a higher priority, and a background caching and/or transmission queue of items of a lower priority, as described in more detail with references to FIGS. 4 and 5.

Further, in some embodiments, step 60 of method 50 may include transmitting predetermined portions of the other digital content items of the dynamic playlist (e.g., the first 30 seconds of each song). In such a case, these predetermined portions of the other digital content items of the dynamic playlist may still be transmitted prior to transmitting any of the digital content items of the established playlist, as indicated by the ordering established during sequencing.

Figure 3:
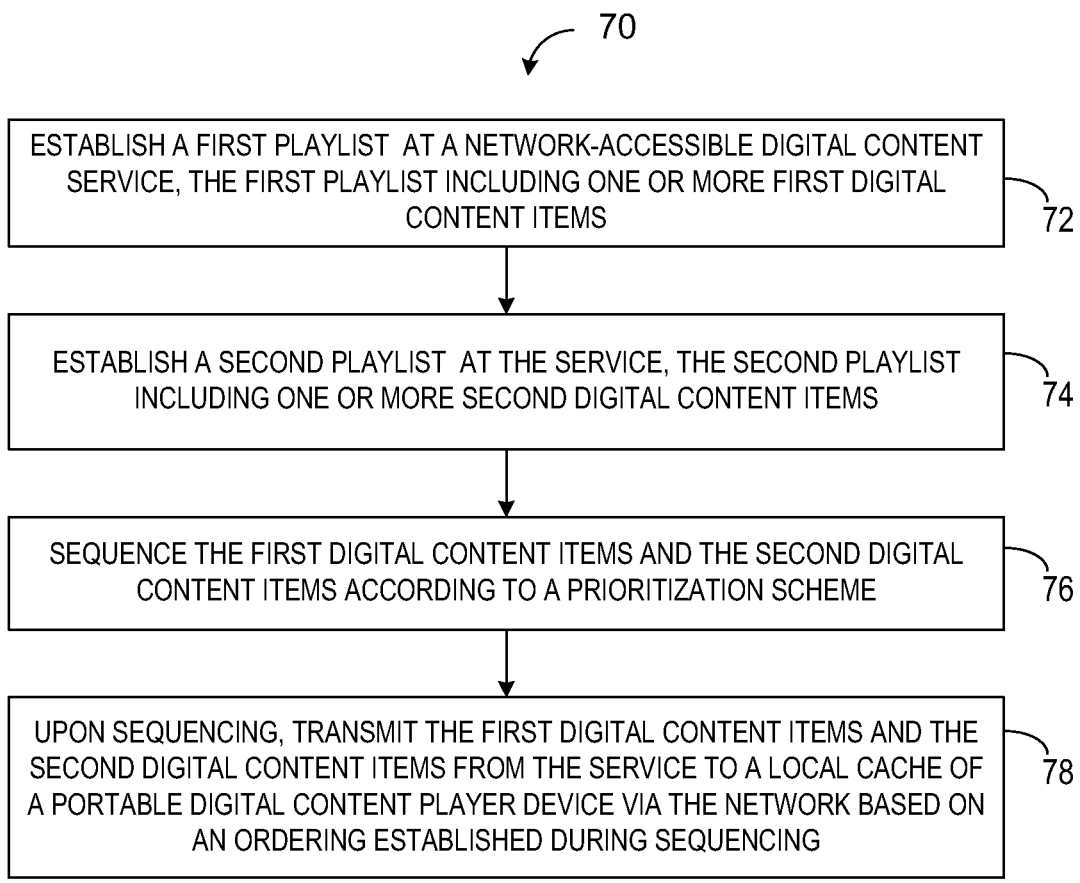
FIG. 3 shows a flow diagram of another embodiment of a method of adaptively sequenced transmission of digital content items.

In some cases, a user may not have requested a song to be played immediately, and therefore sequenced transmission does not include a dynamic playlist, but rather, one or more established playlists. In such a case, background operations are taking place, but these background operations may be interrupted at any time if a song request is received thus causing foreground operations to be of an immediate priority. As an example, FIG. 3 shows such an embodiment of a method 70 of adaptively sequenced transmission of digital content items. At 72 method 70 includes establishing a first playlist at a network-accessible digital content service, where the first playlist includes one or more first digital content items. For example, the first playlist may be an offline playlist as described above.

At 74, method 70 includes establishing a second playlist at the network-accessible digital content service, where the second playlist includes one or more second digital content items. For example, such a playlist may be a user-created playlist or a service-created playlist as described above.

At 76 method 70 includes sequencing the first digital content items and the second digital content items according to a prioritization scheme. For example, the prioritization scheme may indicate the first digital content items of the first playlist to be of a higher priority than the second digital content items of the second playlist. As an example, the first playlist may be an offline playlist, where the prioritization scheme indicates the songs of the offline playlist to be of a higher priority, as the user may want to ensure that these are downloaded and available from the device without the network. Alternatively, the second playlist may be a user-created playlist, a service-created playlist or any combination thereof, including songs the user may or may not be interested in listening to, and are therefore at a lower priority in the prioritization scheme. As indicated above, the offline playlist or other playlists may be assigned a "super-priority," meaning that all of the items on such a playlist will be transmitted before any other items are transmitted. For offline playlists, this ensures that a user's most important content is transferred to the user's device first. That said, in many embodiments, the super-priority transmissions of an offline playlist are still designated as "background" operations. As such, the transmission of an offline playlist can be interrupted by a foreground operation, such as a user making an immediate request for a content item from the service (e.g., a music track that the user wants to listen to immediately).

At 78 method 70 includes upon sequencing, transmitting the first digital content items and the second digital content items from the network-accessible digital content service to a local cache of the portable digital content device via the network based on an ordering established during sequencing. Thus, in the case of the example described above where the first digital content items are of a higher transmission priority than the second digital content items, the first digital content items will be transmitted prior to any of the second digital content items being transmitted.

Additionally, method 70 may further include receiving a request from the portable digital content device via the network for a selected digital content item of a dynamic playlist at the network-accessible digital content service. As described above, such a request may be received at any time during method 70. In such a case, the dynamic playlist is of an immediate priority (i.e. a highest priority) within the prioritization scheme, such that in response to receiving the request, the network-accessible digital content service may then transmit the selected digital content item to the local cache of the portable digital content device. As described above with reference to method 50 shown in FIG. 2, a dynamic playlist may be processed as a foreground operation, whereas the first and second playlists may be processed as a background operation.

Accordingly, method 70 may further include, upon transmitting the selected digital content item, transmitting one of more of the other digital content items of the dynamic playlist from the network-accessible digital content service to the local cache of the portable digital content device via the network. In some cases, each digital content item may be transmitted in its entirety. Alternatively, a predetermined portion of each song may be transmitted.

Method 70 may further include, upon transmitting the other digital content items of the dynamic playlist, returning to the background operations. Such background operations may include re-sequencing the first digital content items and the second digital content items according to the prioritization scheme, followed by transmitting the first digital content items and the second digital content items from the service to the local cache of the device via the network based on an ordering established during re-sequencing.

In some embodiments, adaptively sequenced transmission of digital content items as described herein may include adapting the caching and/or transmission policy based on one or more parameters such as the network connection (e.g., 2G network or 3G network), a size of a memory card within the portable digital content device, current battery level of the portable digital content device, bandwidth and/or scheduling limitations established by the network connection provider, etc.

In some embodiments, the above described methods and processes may be tied to foreground and/or background processing operations. Such operations may be performed in any suitable manner, including building foreground and background caching and/or transmission queues to aid in the sequencing of digital content items in preparation for transmission. FIG. 4 shows an exemplary flow diagram of a method of an embodiment of a caching flow method 80 between a network-accessible digital content service and a portable device.

At 82 method 80 includes receiving a request to download a current digital content item of an immediate playlist of digital content items. Such a current digital content item may, for example, be an item selected by a user of a portable device for immediate play. In response to receiving the request, at 84 method 80 includes transmitting the current digital content item to a portable digital content device. Next, at 84, method 80 includes identifying other digital content items of the immediate playlist. Upon doing so, at 86 method 80 includes building a foreground cache queue of a higher priority including the other digital content items of the immediate playlist. In some cases the foreground caching is contextual caching. At 90, method 80 includes determining if the foreground cache queue empty. If it is determined that the foreground cache queue is not empty, then items of the immediate playlist may still need to be transmitted, in which case at 92 method 80 includes transmitting a next digital content item of the foreground cache queue to the portable digital content device. Steps 90 and 92 may be repeated, until it is determined at 90 that the foreground cache queue is empty.

If the foreground cache queue is determined to be empty, then at 94 method 80 includes building a background cache queue of a lower priority including a plurality of digital content items of a first playlist. Such a step may include items of an offline playlist as indicated at 96, a user-created playlist as indicated at 98 and/or a service-created playlist as indicated at 100. In some embodiments, a background cache queue may include items of any combination of such playlists. In such a case of the background cache queue including items of two or more playlists, a method such as method 70 of FIG. 3 may be used to sequence items of the playlists. In the case of three playlists, a method such as method 110 shown in FIG. 5 may be used, as described in more detail as follows.

Upon building the background cache queue, at 102 method 80 next includes upon transmitting a first digital content item of the background cache queue to the portable digital content device. Upon doing so, each additional item in the background cache queue may also be transmitted to the device. In the case of the background cache queue including items of two or more playlists, such transmission proceeds according to the sequencing established when the background queue was built.

As described above, digital content items of two or more playlists may be sequenced in the background queue. In such a case, the playlists may be of differing levels of transmission priority. FIG. 5 shows an exemplary method 110 of building such a background queue, wherein digital content items of an offline playlist are of a higher priority, items of a user-created playlist are of a lower priority, and items of a service-created playlist are of a lowest priority. It is to be understood that such a background queue could be constructed in any suitable manner, and that method 110 of FIG. 5 illustrates one such suitable approach.

At 112 method 110 includes determining if an offline playlist exists. If it is determined that an offline playlist does exist, then at 114 method 110 includes adding all of the digital content items (i.e. tracks) from the offline playlist to the background queue. If it is determined that an offline playlist does not exist, then method 110 proceed to 116.

At 116 method 110 includes determining if there are any user-created playlists with tracks that have not already been added to the background queue. If it is determined that there are user-created playlists with unadded tracks, then at 118 method 110 includes adding a predetermined number (x) of tracks from a user-created playlist. If it is determined that there are no user-created playlists with unadded tracks, then method 110 proceeds to 120.

At 120 method 110 includes determining if there are any service-created playlists with tracks that have not already been added to the background queue. If it is determined that there are service-created playlists with unadded tracks, then at 122 method 110 includes adding a predetermined number (y) of tracks from a service-created playlist. If it is determined that there are no user-created playlists with unadded tracks, then method 110 proceeds to 124.

Such a process continues until all tracks are added. Accordingly, at 124 method 110 includes determining if there are any more user-created playlists with unadded tracks. If it is determined that there are user-created playlists with unadded tracks, then method 110 returns to 118 and includes adding a predetermined number (x) of tracks from a user-created playlist. If it is determined that there are no more user-created playlists with unadded tracks, then method 110 proceeds to 126.

At 126 method 110 includes determining if there are any more service-created playlists with unadded tracks. If it is determined that there are service-created playlists with unadded tracks, then method 110 returns to 122 and includes adding a predetermined number (y) of tracks from a service-created playlist. If it is determined that there are no more service-created playlists with unadded tracks, then method 110 ends.

In some cases, the predetermined numbers x and y may further indicate that the tracks of the user-created playlists are of a higher-priority than those of the service-created playlist, by for example having x be larger than y. For example, ten tracks from user-created playlists may be added whereas only five tracks from service-created playlists may be added.

Further, in some embodiments, the selected tracks x and y may be selected sequentially, i.e. x tracks from a first user-created playlist, y tracks from a first service-created playlist, x tracks from a second user-created playlist, y tracks from a second service-created playlist, etc.). In some embodiments, the selected tracks x and y may be selected according to categories, i.e. x tracks from a most-played user-created playlist, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A digital content system comprising:
a network-accessible digital content service comprising a cache management subsystem and a mass storage subsystem containing a plurality of playlists that are variously associated with a plurality of user accounts, each playlist including one or more digital content items and each playlist having one or more playlist attributes; and
a plurality of portable digital content devices physically distinct from and operatively coupled with the network-accessible digital content service via a network,
wherein each portable digital content device comprises memory providing a local cache and is associated with one of the plurality of user accounts, and
wherein, for each portable digital content device, the network-accessible digital content service is configured to
adaptively sequence an order of the digital content items of two or more playlists for transmission, and
send the digital content items of the two or more playlists in the sequenced order from the network-accessible digital content service to the local cache of that portable digital content device via the network, the sequenced order of the digital content items of the two or more playlists based on the playlist attributes of each of the two or more playlists, the digital content items of the two or more playlists only stored on the local cache once the digital content items of the two or more playlists are received from the network-accessible digital content service.

2. The system of claim 1, wherein the digital content items of the two or more playlists include one or more digital content items of a first playlist and one or more digital content items of a second playlist, the first playlist having a playlist attribute of a higher transmission priority and the second playlist having a playlist attribute of a lower transmission priority.

3. The system of claim 2, wherein the network-accessible digital content service is further configured to, in response to adaptively sequencing an order of the digital content items of the first playlist and the digital content items of the second playlist, transmit the digital content items of the first playlist prior to transmitting any digital content items of the second playlist.

4. The system of claim 3, wherein the first playlist includes an immediate playlist of one or more digital content items available upon transmission for subsequent playback from the local cache of that portable digital content device, the immediate playlist including a selected digital content item selected by a user of that portable digital content device, and the second playlist includes a predetermined playlist associated with the user account corresponding to a user of that portable digital content device.

5. The system of claim 3, wherein the first playlist includes an offline playlist of one or more digital content items available upon transmission for subsequent playback from the local cache of that portable digital content device without the network, and wherein the second playlist is a predetermined playlist associated with the user account corresponding to a user of that portable digital content device.

6. The system of claim 2, wherein the network-accessible digital content service is further configured to, in response to adaptively sequencing transmission of the digital content items of the first playlist and the digital content items of the second playlist, transmit a first digital content item of the first playlist and one or more predetermined portions of the other digital content items of the first playlist prior to transmitting any digital content items of the second playlist.

7. The system of claim 1, wherein the network-accessible digital content service is further configured to obtain a size of the memory of each of the portable digital content devices via the network, and wherein for each of the portable digital content devices, the network-accessible digital content service is further configured to determine the digital content items of the two or more playlists to be transmitted to the portable digital content device based on the size of the memory of the portable digital content device.

8. The method of claim 1, further comprising:
building a foreground cache queue of higher priority digital content items;
building a background cache queue of lower priority digital content items;
sending the digital content items of the foreground cache queue to the local cache of the portable digital content device; and
if the foreground cache queue is empty, then sending the digital content items of the background cache queue to the local cache of the portable digital content device.

9. The method of claim 1, wherein the sequenced order of the digital content items of the two or more playlists is further based on parameters of the network.

10. A computer-implemented method of adaptively sequencing transmission of digital content items from a network-accessible digital content service to a portable digital content device via a network, the portable digital content device being physically distinct from the network-accessible digital content service, the method comprising:
creating an established playlist at the network-accessible digital content service, the established playlist including one or more digital content items;
sequencing, at the network-accessible digital content service, an order of the digital content items of the established playlist for transmission;
sending the digital content items of the established playlist from the network-accessible digital content service to the portable digital content device via the network in the sequenced order, the digital content items of the established playlist sent to the portable digital content device without a digital content item playback request; and
upon receiving a request from the portable digital content device for a selected digital content item contained on a dynamic playlist at the network-accessible digital content service, transmitting the selected digital content item to the portable digital content device and re-sequencing transmission priorities so that any remaining digital content items from the dynamic playlist are sequenced for transmission to the portable content device prior to transmission of any un-transmitted digital content items from the established playlist.

11. The method of claim 10, wherein the established playlist is associated with a user account on the network-accessible digital content service and the user account is associated with a user of the portable digital content device.

12. The method of claim 11, wherein the established playlist is one of a plurality of established playlists associated with the user account, and wherein each of the established playlists contains digital content items and has a different relative priority level, the method further comprising sequencing transmission of digital content items on the established playlists from the network-accessible digital content server to the portable digital content device based upon the different relative priority levels of the established playlists.

13. The method of claim 12, wherein one of the plurality of established playlists is assigned a super-priority, and wherein sequencing transmission of digital content items on the established playlists includes sequencing all of the digital content items from the super-priority established playlist so that they are transmitted prior to transmission of any digital content item from any other of the plurality of established playlists.

14. The method of claim 12, wherein sequencing transmission of digital content items on the established playlists includes transmitting digital content items from a higher priority established playlist more frequently than digital content items from a lower priority established playlist.

15. The method of claim 12, wherein the plurality of established playlists includes a user-generated playlist of digital content items selected by the user and a service-generated playlist of digital content items suggested to the user by the network-accessible digital content server.

16. The method of claim 15, further comprising assigning a higher digital content transmission priority to the user-generated playlist than to the service-generated playlist.

17. The method of claim 16, wherein the plurality of established playlists further includes a super-priority user-generated playlist, wherein the super-priority results in sequencing transmission of digital content items from the super-priority user-generated playlist so that they are all transmitted to the portable device prior to transmission of any digital content item from the user-generated playlist and prior to transmission of any digital content item from the service-generated playlist.

18. A computer-implemented method of adaptively sequencing transmission of digital content items from a network-accessible digital content service to a portable digital content device via a network, the method comprising:
  establishing, in a user account, a first playlist of digital content items at the network-accessible digital content service, the first playlist being a super-priority user-generated playlist containing digital content items selected by a user of the user account;
  establishing, in the user account, a second playlist of digital content items at the network-accessible digital content service, the second playlist being a normal priority user-generated playlist containing digital content items selected by the user;
  establishing in the user account a third playlist of digital content items at the network-accessible digital content service, the third playlist being a service-generated playlist containing digital content items suggested for the user by the network-accessible digital content server;
  sequencing transmission of the digital content items of the first playlist, the digital content items of the second playlist, and the digital content items of the third playlist according to a prioritization scheme in which the super-priority user-generated playlist and the normal priority user-generated playlist are prioritized higher than the service-generated playlist;
  super-prioritizing transmission from the super-priority user-generated playlist such that all of its digital content items are transmitted prior to any transmission from the normal priority user-generated playlist or the service-generated playlist; and
  transmitting the digital content items of the first playlist, the digital content items of the second playlist, and the digital content items of the third playlist to the portable digital content device in accordance with the prioritization scheme, wherein transmitting includes downloading the digital content items to the portable digital content device.

19. The method of claim 18, further comprising:
receiving, at the network-accessible digital content server, an immediate download request from the portable digital content device for a selected digital content item stored on the digital content server; and
in response to the immediate download request, ceasing transmission of any digital content items to the portable digital content device from any of the first playlist, second playlist and third playlist, until the selected digital content item and other digital content items from its associated playlist are transmitted to the portable digital content device.

20. The method of claim 18, further comprising:
receiving, at the network-accessible digital content server, an immediate download request from the portable digital content device for a selected digital content item stored on the digital content server; and
in response to the immediate download request, ceasing transmission of any digital content items to the portable digital content device from any of the first playlist, second playlist and third playlist, until transmission to the portable digital content device has been completed for both the selected digital content item and for at least portions of other digital content items contained on a playlist associated with the selected digital content item.

* * * * *